(12) United States Patent
Yang et al.

(10) Patent No.: US 11,778,165 B2
(45) Date of Patent: Oct. 3, 2023

(54) FLOATING THREE-DIMENSIONAL IMAGE DISPLAY SYSTEM

(71) Applicant: Lixel Inc., Taipei (TW)

(72) Inventors: Chun-Hsiang Yang, Hsinchu (TW);
Chih-Hung Ting, New Taipei (TW);
Kai-Chieh Chang, Kaohsiung (TW)

(73) Assignee: Lixel Inc., Taipei (TW)

( * ) Notice: Subject to any disclaimer, the term of this patent is extended or adjusted under 35 U.S.C. 154(b) by 203 days.

(21) Appl. No.: 17/242,312

(22) Filed: Apr. 28, 2021

(65) Prior Publication Data

US 2022/0232200 A1 Jul. 21, 2022

(30) Foreign Application Priority Data

Jan. 20, 2021 (TW) ................................ 110102163

(51) Int. Cl.
| | |
|---|---|
| *H04N 13/363* | (2018.01) |
| *H04N 13/349* | (2018.01) |
| *G06T 19/20* | (2011.01) |
| *G06F 3/0354* | (2013.01) |
| *G06F 3/01* | (2006.01) |

(52) U.S. Cl.
CPC ........... *H04N 13/363* (2018.05); *G06T 19/20* (2013.01); *H04N 13/349* (2018.05); *G06F 3/014* (2013.01); *G06F 3/03545* (2013.01)

(58) Field of Classification Search
None
See application file for complete search history.

(56) References Cited

U.S. PATENT DOCUMENTS

| | | | |
|---|---|---|---|
| 8,477,439 B2 | 7/2013 | Imai | |
| 10,502,967 B2 | 12/2019 | Yang et al. | |
| 2007/0159525 A1 | 7/2007 | Tomisawa et al. | |
| 2010/0195055 A1* | 8/2010 | Maekawa | G02B 5/136 353/10 |
| 2012/0314021 A1* | 12/2012 | Tsang | G06F 18/00 348/40 |
| 2014/0267598 A1* | 9/2014 | Drouin | G03H 1/2294 348/40 |
| 2015/0277378 A1* | 10/2015 | Smithwick | G03H 1/0808 359/9 |
| 2016/0219260 A1 | 7/2016 | Sato et al. | |

(Continued)

FOREIGN PATENT DOCUMENTS

| | | |
|---|---|---|
| CN | 103941813 A | 7/2014 |
| CN | 106646899 A | 5/2017 |
| JP | 200545824 A | 2/2005 |

(Continued)

*Primary Examiner* — Clifford Hilaire
(74) *Attorney, Agent, or Firm* — Li & Cai Intellectual Property Office

(57) ABSTRACT

A floating three-dimensional image display system is provided. The floating three-dimensional image display system includes a controller and a first floating image display device. The controller converts a plurality of image information of an electronic device into a plurality of first floating image information according to the plurality of image information and a plurality of depth information of the electronic device, and displays the plurality of first floating image information in a space above a first side of the first floating image display device through the first floating image display device.

9 Claims, 16 Drawing Sheets

(56) References Cited

U.S. PATENT DOCUMENTS

| | | | |
|---|---|---|---|
| 2017/0038597 A1* | 2/2017 | Li | G02B 30/28 |
| 2020/0142208 A1 | 5/2020 | Yang et al. | |

FOREIGN PATENT DOCUMENTS

| | | |
|---|---|---|
| JP | 2007206519 A | 8/2007 |
| JP | 200889985 A | 4/2008 |
| JP | 200986395 A | 4/2009 |
| JP | 2016140056 A | 8/2016 |
| TW | I665905 B | 7/2019 |
| TW | 201947285 A | 12/2019 |
| TW | I700516 B | 8/2020 |
| WO | WO2005088386 A1 | 9/2005 |
| WO | WO2006001158 A1 | 1/2006 |
| WO | WO2007116910 A1 | 10/2007 |
| WO | WO2009017134 A1 | 2/2009 |

* cited by examiner

FLOATING THREE-DIMENSIONAL IMAGE DISPLAY SYSTEM

CROSS-REFERENCE TO RELATED PATENT APPLICATION

This application claims the benefit of priority to Taiwan Patent Application No. 110102163, filed on Jan. 20, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a floating three-dimensional image display system, and more particularly to a floating three-dimensional image display system that converts image information from another electronic device into floating three-dimensional image information.

BACKGROUND OF THE DISCLOSURE

Currently, many electronic products are capable of generating three-dimensional image information for being displayed on a flat-panel display. However, most of current audio and video information can only be played on the flat-panel display, which results in an inadequacy of a user perception.

Accordingly, how to convert general two-dimensional image information into three-dimensional image information that can be viewed and interacted with in real time has become one of the important issues to be solved in this field.

SUMMARY OF THE DISCLOSURE

In response to the above-referenced technical inadequacy, the present disclosure provides a floating three-dimensional image display system that receives a plurality of image information or a plurality of control signals. The floating three-dimensional image display system includes a controller and a first floating image display device. The first floating image display device is electrically connected to the controller. The controller generates the plurality of image information as a plurality of first floating image information according to the plurality of image information and a plurality of depth information, and displays the first floating image information in a space above a first side of the first floating image display device through the first floating image display device.

Therefore, one of the beneficial effects of the present disclosure is that the floating three-dimensional image display system is capable of receiving the image information provided by the electronic device and converting the same to display three-dimensional floating image information, so that a user experience can be expanded and a user can interact with the three-dimensional floating image information in real time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
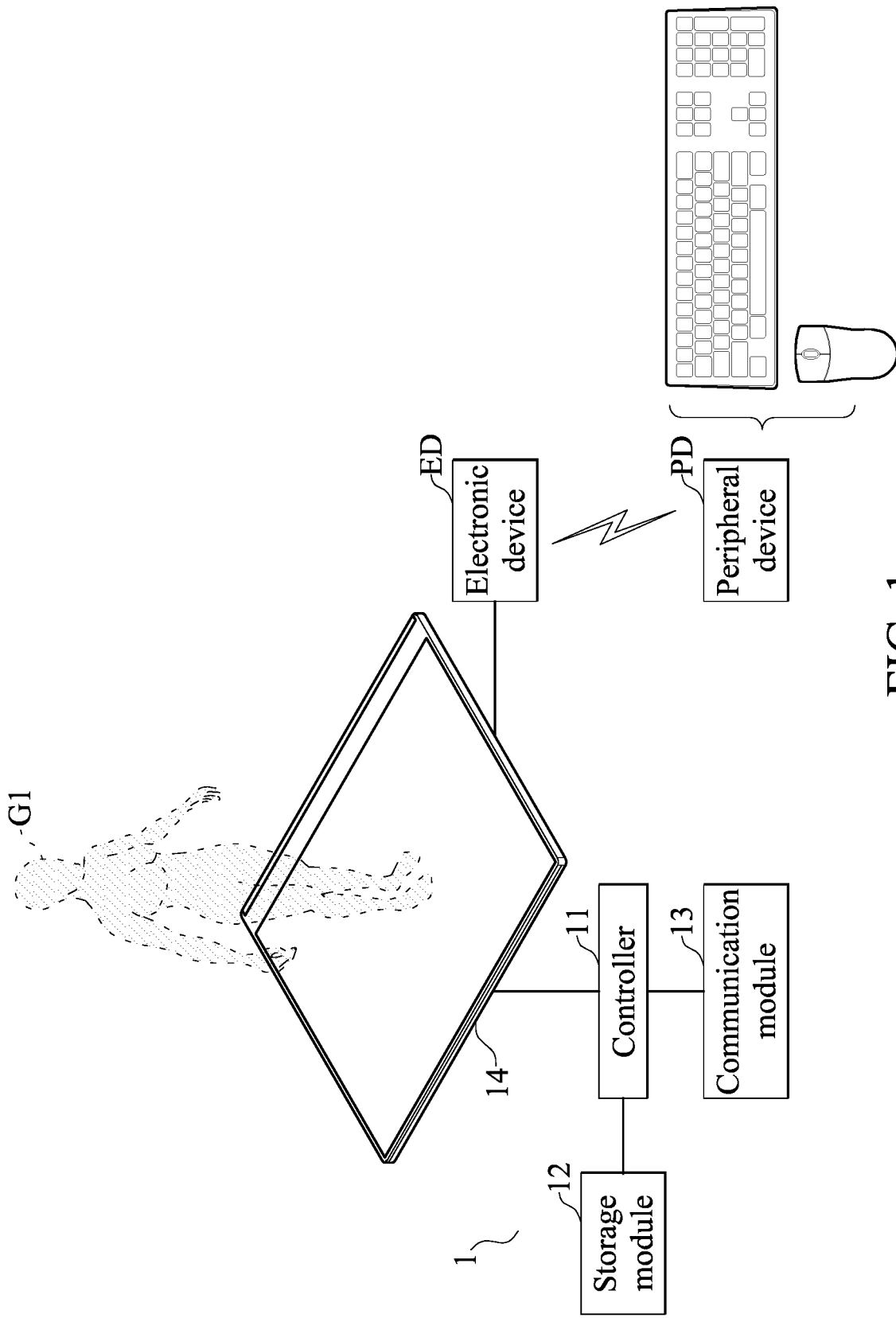
FIG. 1 is a schematic view of a floating three-dimensional image display system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
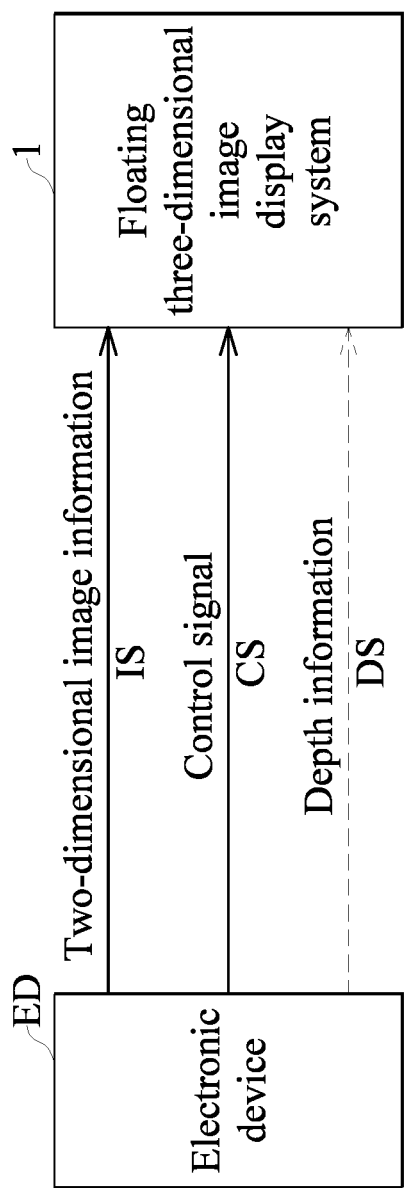
FIG. 2 is a schematic view illustrating signal transmission from an electronic device to the floating three-dimensional image display system of FIG. 1.

Reference is made to FIG. 1 and FIG. 2, in which FIG. 1 is a schematic view of a floating three-dimensional image display system according to a first embodiment of the present disclosure, and FIG. 2 is a schematic view illustrating signal transmission from an electronic device to the floating three-dimensional image display system of FIG. 1.

A floating three-dimensional image display system 1 is connected to an electronic device ED and receives a plurality of image information or a plurality of control signals from the electronic device ED.

The floating three-dimensional image display system 1 includes a controller 11, a storage module 12, a communication module 13 and a first floating image display device 14.

The controller 11 is electrically connected to the storage module 12, the communication module 13 and the first floating image display device 14.

In the present embodiment, the controller 11 can convert the plurality of image information from the electronic device ED into a plurality of first floating image information G1, and display the plurality of first floating image information G1 in a space above a first side of the first floating image display device 14 through the first floating image display device 14. That is, two-dimensional image information IS provided by the electronic device ED can be converted into the first floating image information G1, which is then displayed in the space above the first side of the first floating image display device 14 through the floating three-dimensional image display system 1.

Referring to FIG. 2, in addition to providing a plurality of the two-dimensional image information IS, the electronic device ED can also provide a plurality of depth information DS corresponding to the plurality of the two-dimensional image information IS, so that the floating three-dimensional image display system 1 can perform a conversion on the two-dimensional image information IS. In addition, the electronic device ED can also transmit a plurality of control signals CS to the controller 11 of the floating three-dimensional image display system 1, so as to control the first floating image information G1 displayed in the space above the first side of the first floating image display device 14.

In the present embodiment, the controller 11 can also recognize and determine the depth information DS of at least one object image information among the plurality of the two-dimensional image information IS provided by the electronic device ED through a machine learning process, so as to convert the at least one object image information into the three-dimensional information that is floating.

The electronic device ED can be a smart phone, a tablet computer, a smart watch, a game console (such as PLAYSTATION® 4 or PLAYSTATION® 5), a desktop computer, a gamepad or a game server.

In addition, a user can also control the first floating image information G1 displayed in the space above the first side of the first floating image display device 14 through a peripheral device PD that is connected to the electronic device ED.

The peripheral device PD can be a smart phone, a tablet computer, a smart watch, a joystick, a gamepad, a remote controller, a mouse device or a motion controller.

The peripheral device PD can transmit the plurality of control signals CS to the controller 11 of the floating image display system 1 through the electronic device ED, so as to control the first floating image information G1 displayed in the space above the first side of the first floating image display device 14.

Second Embodiment

Figure 3:
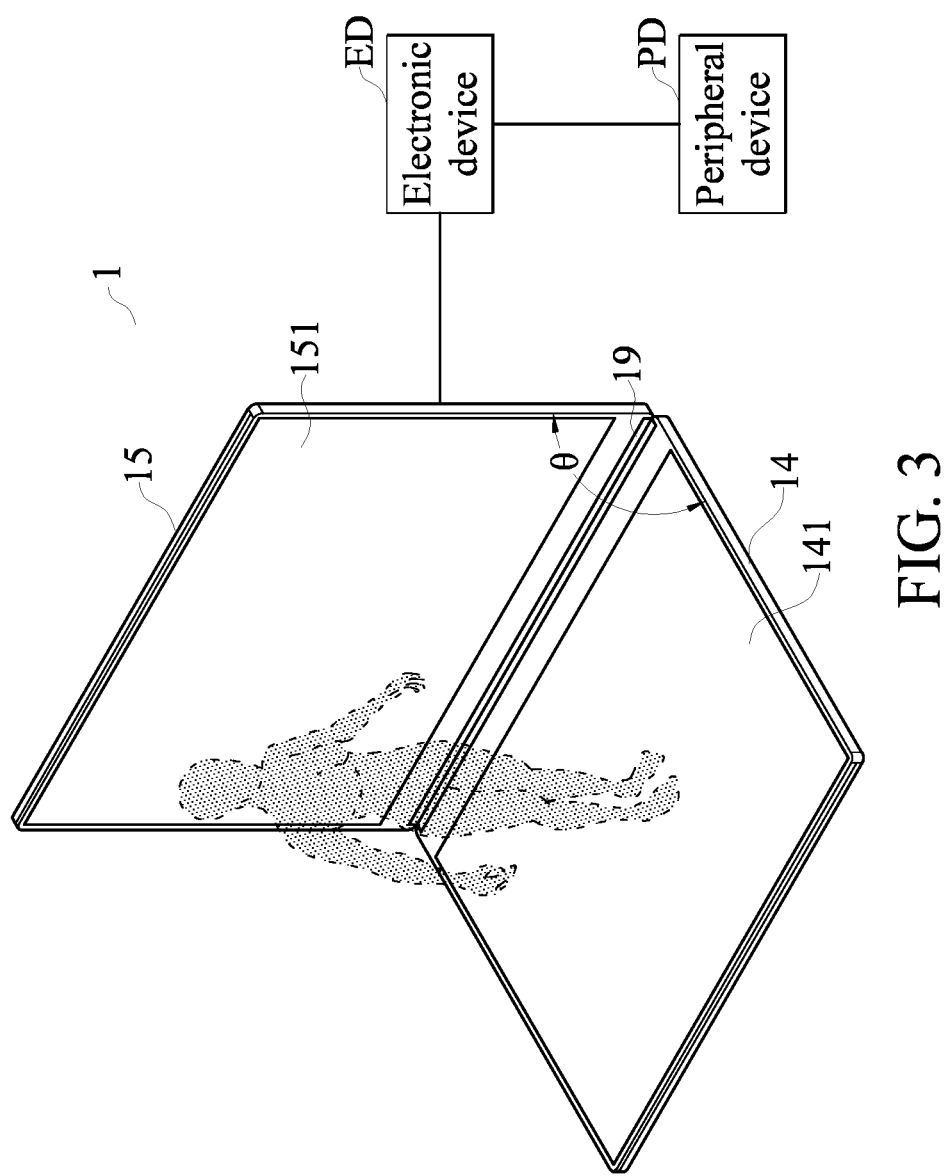
FIG. 3 is a schematic view of the floating three-dimensional image display system according to a second embodiment of the present disclosure.
Figure 4:
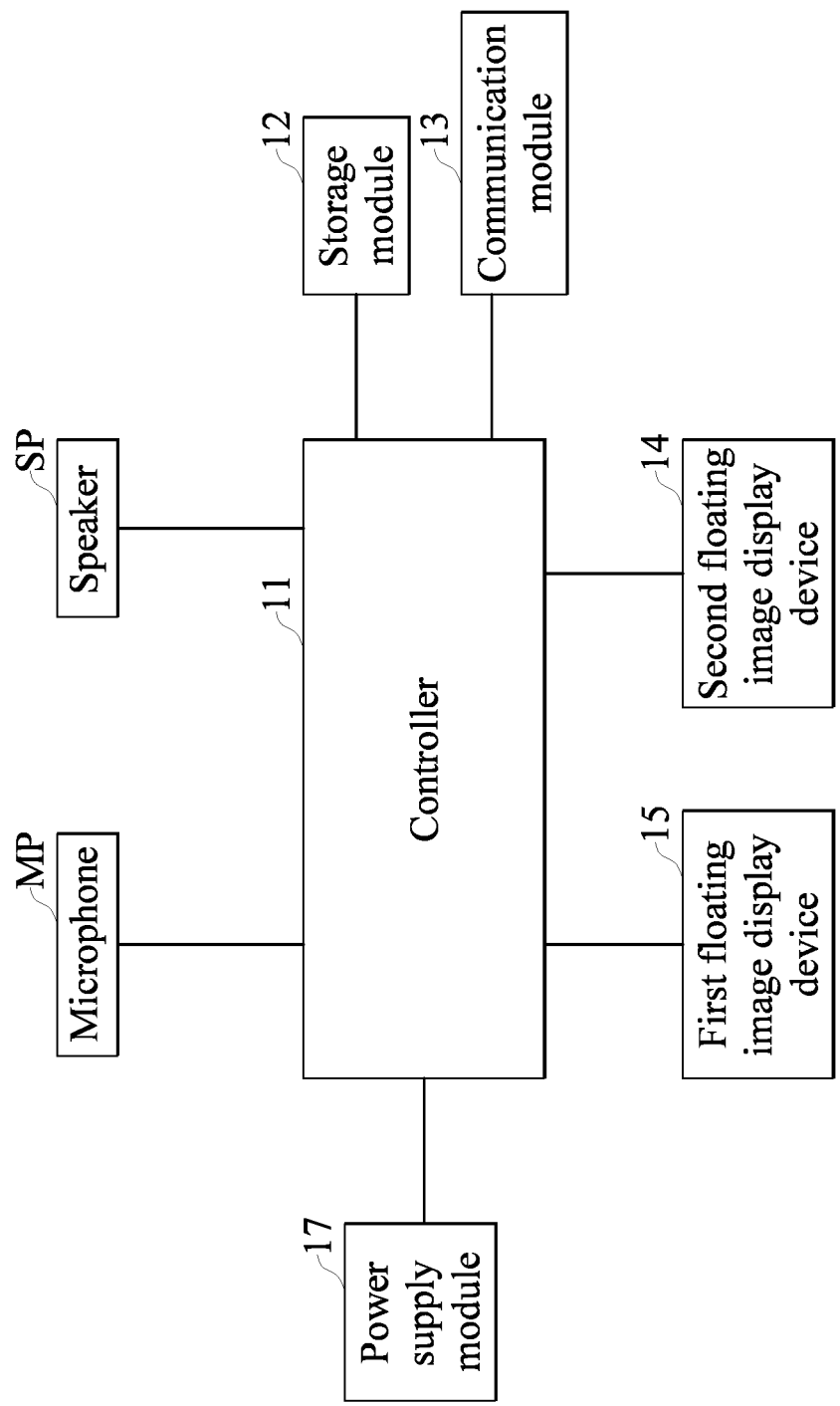
FIG. 4 is a functional block diagram of the floating three-dimensional image display system according to the second embodiment of the present disclosure.
Figure 5:
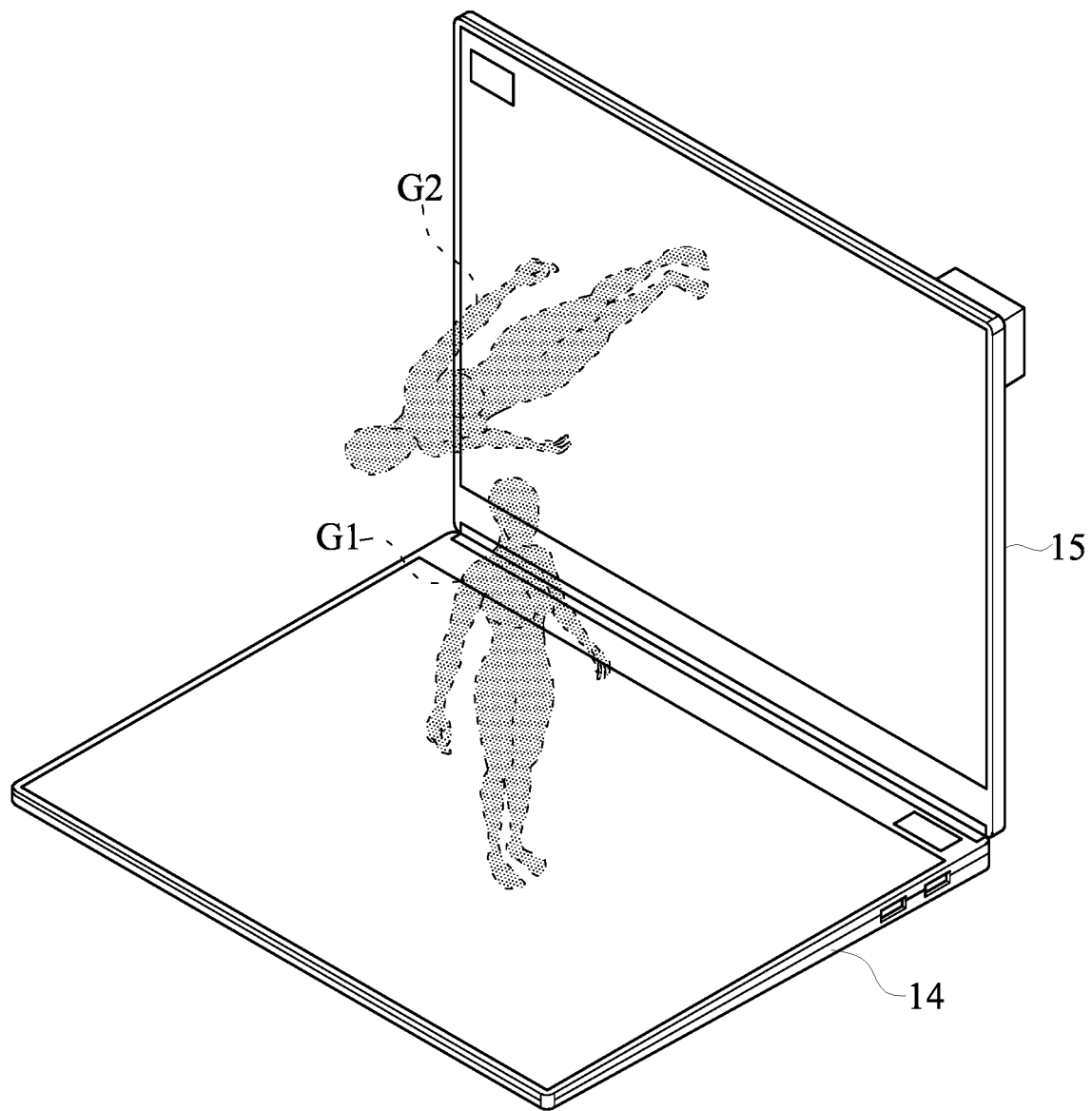
FIG. 5 is a schematic view of a first floating image display device and a second floating image display device respectively displaying first floating image information and second floating image information according to one embodiment of the present disclosure.
Figure 6:
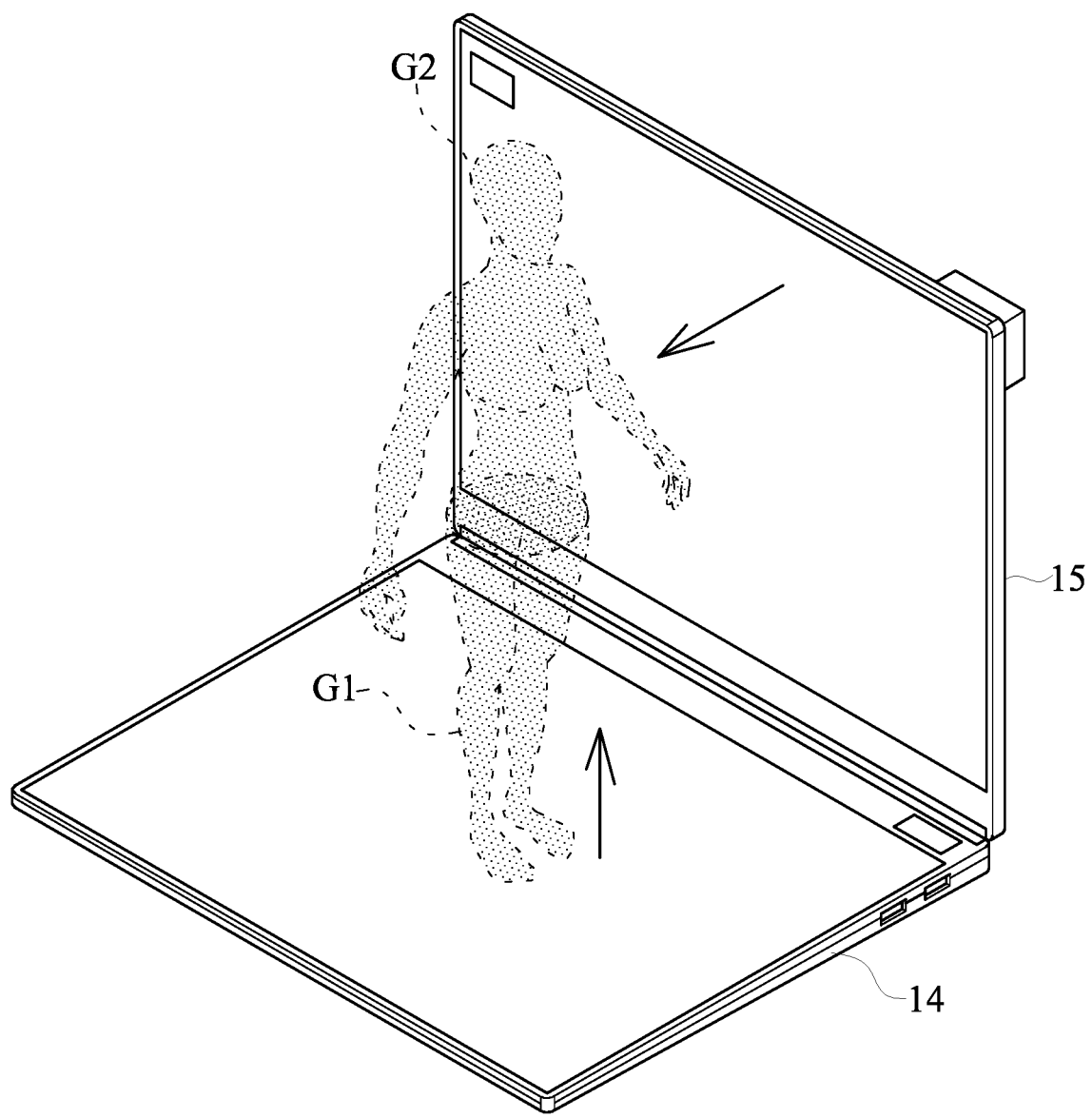
FIG. 6 is a schematic view of the first floating image display device and the second floating image display device collectively displaying integrated floating image information according to one embodiment of the present disclosure.

Reference is made to FIG. 3 to FIG. 6, in which FIG. 3 is a schematic view of a floating three-dimensional image display system according to a second embodiment of the present disclosure, FIG. 4 is a functional block diagram of the floating three-dimensional image display system according to the second embodiment of the present disclosure, FIG. 5 is a schematic view of a first floating image display device and a second floating image display device according to embodiments of the present disclosure displaying first floating image information and second floating image information, respectively, and FIG. 6 is a schematic view of the first floating image display device and the second floating image display device according to embodiments of the present disclosure cooperatively displaying integrated floating image information.

Before a complete image that is three-dimensional is displayed, the complete image is divided into different blocks by a computer algorithm and an image of each block is calculated. Light emitted by a plurality of display units of the first floating image display device 14 or a second floating image display device 15 focuses in a space to form the image of each block. The images of different blocks are combined to form the complete image that is three-dimensional. The first floating image display device 14 can display one portion of the complete image that is three-dimensional, the second floating image display device 15 can display another portion of the complete image that is three-dimensional, and the two portions described above can be combined into the complete image that is three-dimensional.

The floating three-dimensional image display system 1 can also include one second floating image display device 15.

The second floating image display device 15 is electrically connected to the controller 11. The second floating image display device 15 is detachably connected to the first floating image display device 14. The first floating image display device 14 and the second floating image display device 15 have an included angle θ in between. The second floating image display device 15 can be connected to the first floating image display device 14 through a connection module 19. The connection module 19 is a hinge. In another embodiment, the first floating image display device 14 can be electrically connected to the second floating image display device 15 to improve a cooperative operation.

The controller 11 displays a plurality of second floating image information G2 in a space above a first side of the second floating image display device 15 according to the plurality of image information of the electronic device ED.

That is, when the first floating image display device 14 is connected to the second floating image display device 15, the first floating image display device 14 and the second floating image display device 15 provide the plurality of first floating image information G1 and the plurality of second floating image information G2, respectively, so as to cooperatively display integrated floating image information GIN. The plurality of first floating image information G1, the plurality of second floating image information G2 and the integrated floating image information GIN are each three-dimensional floating image information. That is, the user can view the floating image information from various angles.

The first floating image display device 14 and the second floating image display device 15 can each independently display the plurality of floating image information. The first floating image display device 14 and the second floating image display device 15 can also each provide the plurality of floating image information, which can be collectively displayed as the integrated floating image information GIN.

The controller 11 can convert the plurality of two-dimensional image information IS of the electronic device ED into the plurality of first floating image information G1 and the plurality of second floating image information G2. The plurality of first floating image information G1 and the plurality of second floating image information G2 are collectively displayed as the plurality of integrated floating image information GIN.

The electronic device ED can be a smart phone, a tablet computer, a smart watch, a game console (such as PLAYSTATION® 4 or PLAYSTATION® 5), a desktop computer, a gamepad or a game server.

In addition, the user can also control the first floating image information G1 displayed in the space above the first side of the first floating image display device 14 through a peripheral device PD that is connected to the electronic device ED.

The peripheral device PD can be a smart phone, a tablet computer, a smart watch, a joystick, a gamepad, a remote control, a mouse device or a motion controller.

The peripheral device PD can transmit the plurality of control signals CS to the controller 11 of the floating three-dimensional image display system 1 through the electronic device ED, so as to control the first floating image information G1 displayed in the space above the first side of the first floating image display device 14.

The plurality of image information displayed by the first display module 141 or the plurality of image information displayed by the second display module 151 can be the two-dimensional image information IS transmitted by the electronic device ED, or a portion of a background content of the two-dimensional image information IS transmitted by the electronic device ED and selected by the controller 11. However, the present disclosure is not limited thereto.

In addition, the controller 11 of the floating three-dimensional image display system 1 can communicate with a server through the communication module 13. The controller 11 of the floating image system 1 can transmit the plurality of first floating image information G1, the second floating image information G2 and the integrated floating image information GIN to the server for calculation.

A power supply module 17 is used to provide driving electrical energy to the controller 11, the storage module 12, the communication module 13, the first floating image display device 14, and the second floating image display device 15.

The first floating image information G1, the second floating image information G2 and the integrated floating image information GIN can be stored in the storage module 12 or the server.

The controller 11 is a central processing unit (CPU), an application specific integrated circuit (ASIC) or a microcontroller (MCU).

The storage module 12 is a flash memory, a read-only memory, a programmable read-only memory, an electrically rewritable read-only memory, an erasable and programmable read-only memory or an electrically-erasable programmable read-only memory.

The communication module 13 includes a wired communication unit (not shown in figures) or a wireless communication unit (not shown in figures). The wired communication module (not shown in figures) can also be set up independently to communicate with the server, so as to receive a control signal from the server or data from a database of the server. When the communication module 13 is the wireless communication unit, the communication module 13 can be a WI-FI communication unit, a BLUETOOTH communication unit, a Zigbee communication unit, a LoRa communication unit, a Sigfox communication unit or an NB-IoT communication unit.

The power supply module 17 can be a direct current (DC) to DC voltage converter or an alternating current (AC) to DC voltage converter. The power supply module 17 can also include a battery unit (not shown in figures). The battery unit (not shown in figures) is a lithium ion battery, a lithium manganese dioxide battery, a lithium polymer battery or a nickel hydrogen battery.

In addition, the floating image system 1 also includes a microphone MP and a speaker SP. The microphone MP and the speaker SP are each electrically connected to the controller 11. The user can control and interact with the first floating image information G1, the second floating image information G2 or the integrated floating image information GIN by using an audio control signal through the microphone MP and the speaker SP.

In addition, the controller 11, the storage module 12, the communication module 13, the first floating image display device 14, the second floating image display device 15, the power supply module 17, the microphone MP and the speaker SP can be disposed in a casing (not shown in figures).

In another embodiment, the controller 11, the storage module 12, the communication module 13, the power supply module 17, the microphone MP and the speaker SP can be disposed in the first floating image display device 14 or the second floating image display device 15. That is, the first floating image display device 14 or the second floating image display device 15 can independently process the two-dimensional image information or the three-dimensional floating image information. When the first floating image display device 14 is electrically connected to the second floating image display device 15, every component of the first floating image display device 14 and the second floating image display device 15 can share resources with each other and operate cooperatively.

Figure 7:
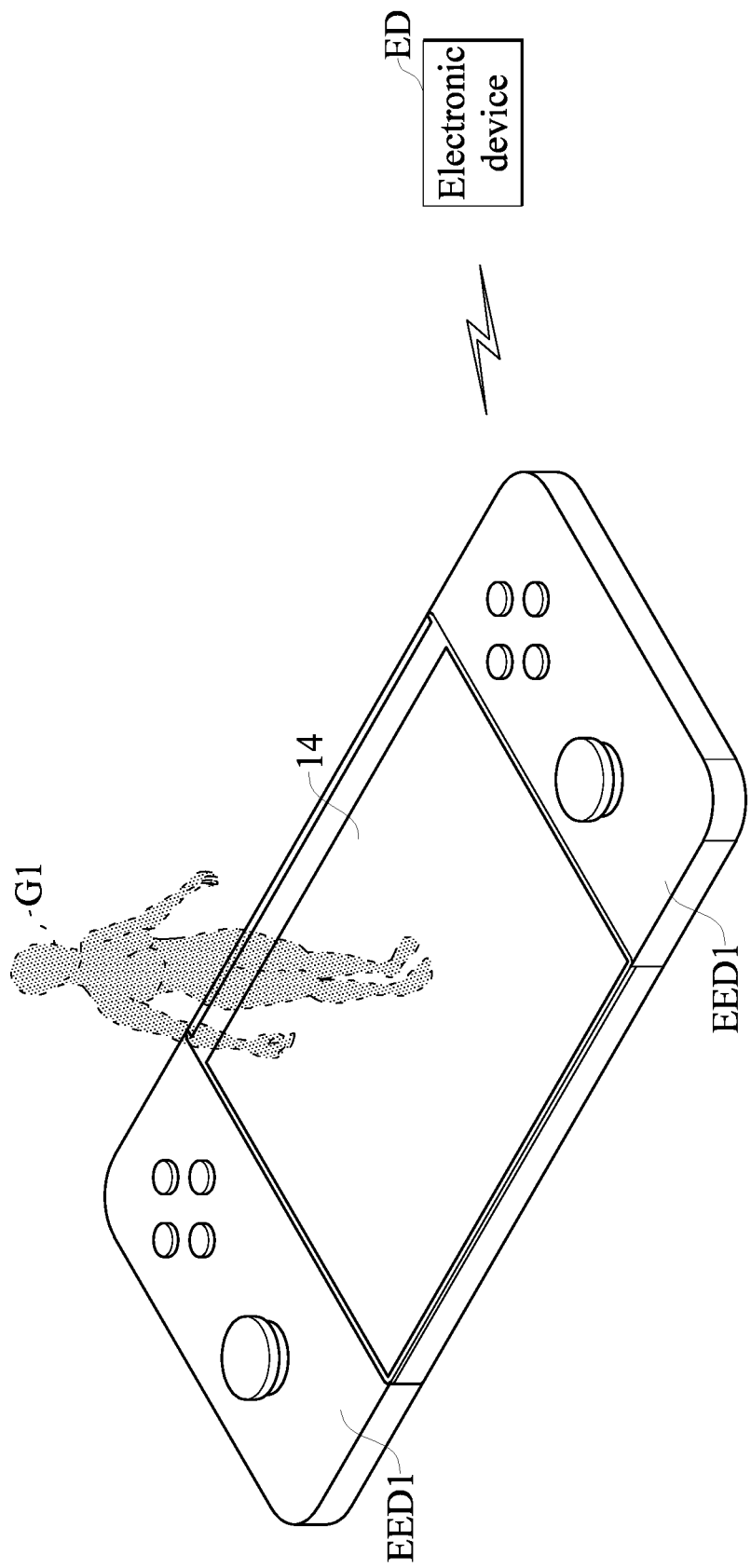
FIG. 7 is a schematic view of the first floating image display device of the floating three-dimensional image display system being connected to a first expansion gamepad according to one embodiment of the present disclosure.
Figure 8:
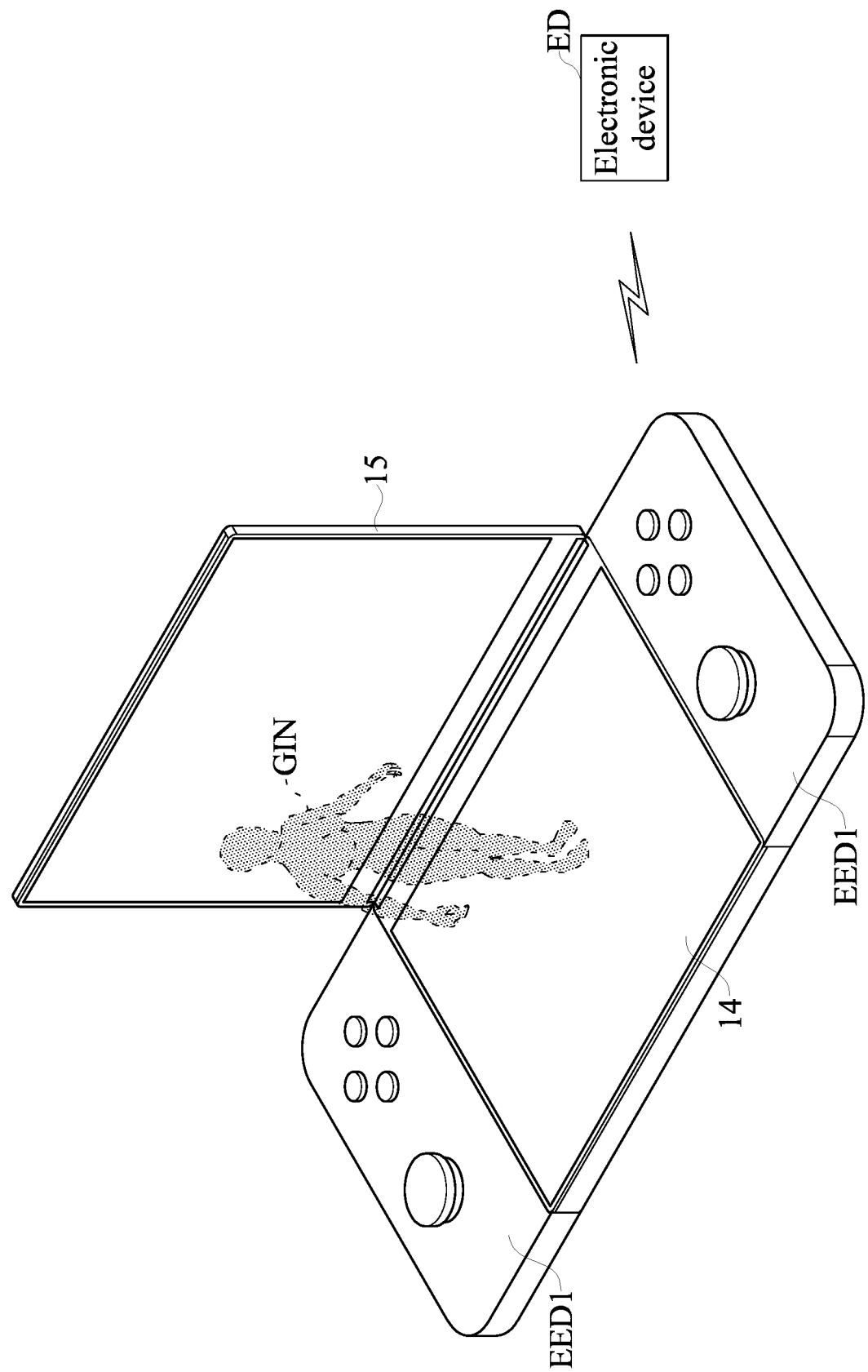
FIG. 8 is a schematic view of the first floating image display device and the second floating image display device of the floating three-dimensional image display system being connected to the first expansion gamepad according to one embodiment of the present disclosure.
Figure 9:
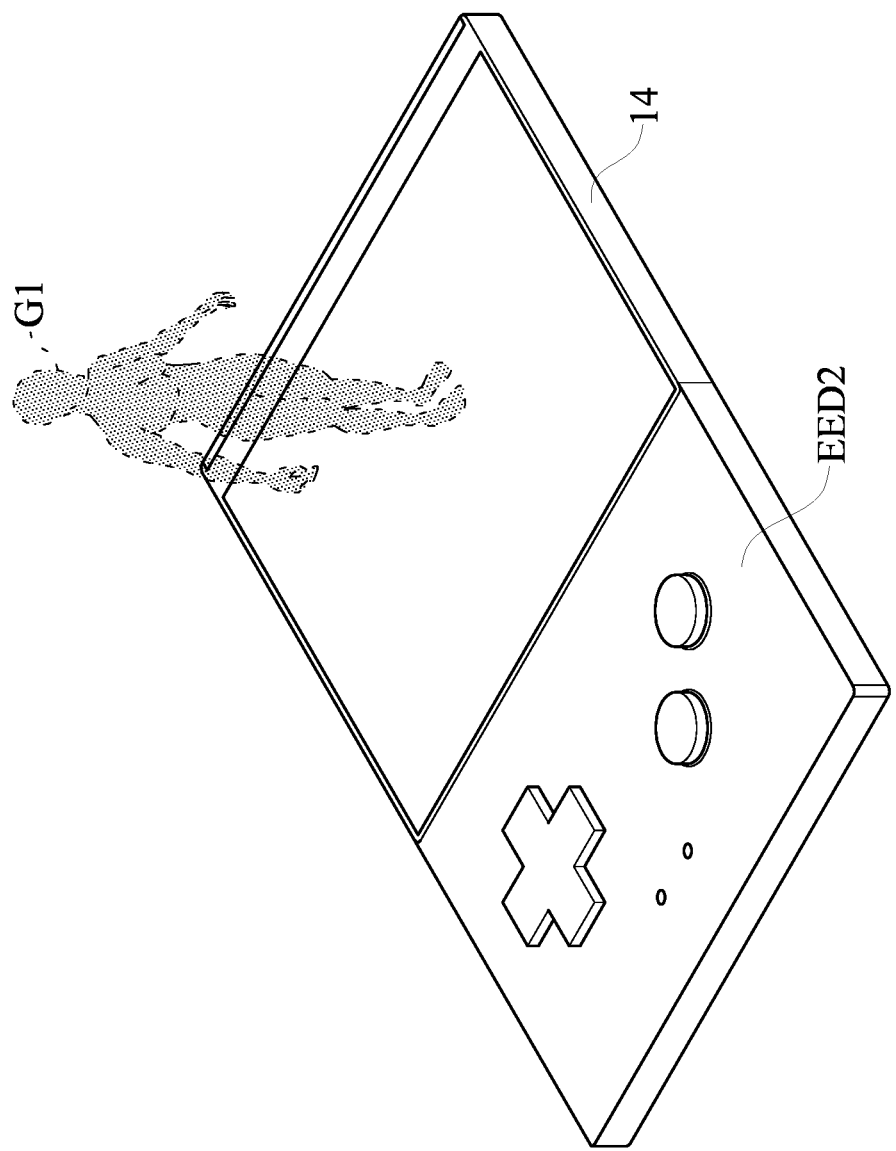
FIG. 9 is another schematic view of the first floating image display device of the floating three-dimensional image display system being connected to a second expansion gamepad according to one embodiment of the present disclosure.
Figure 10:
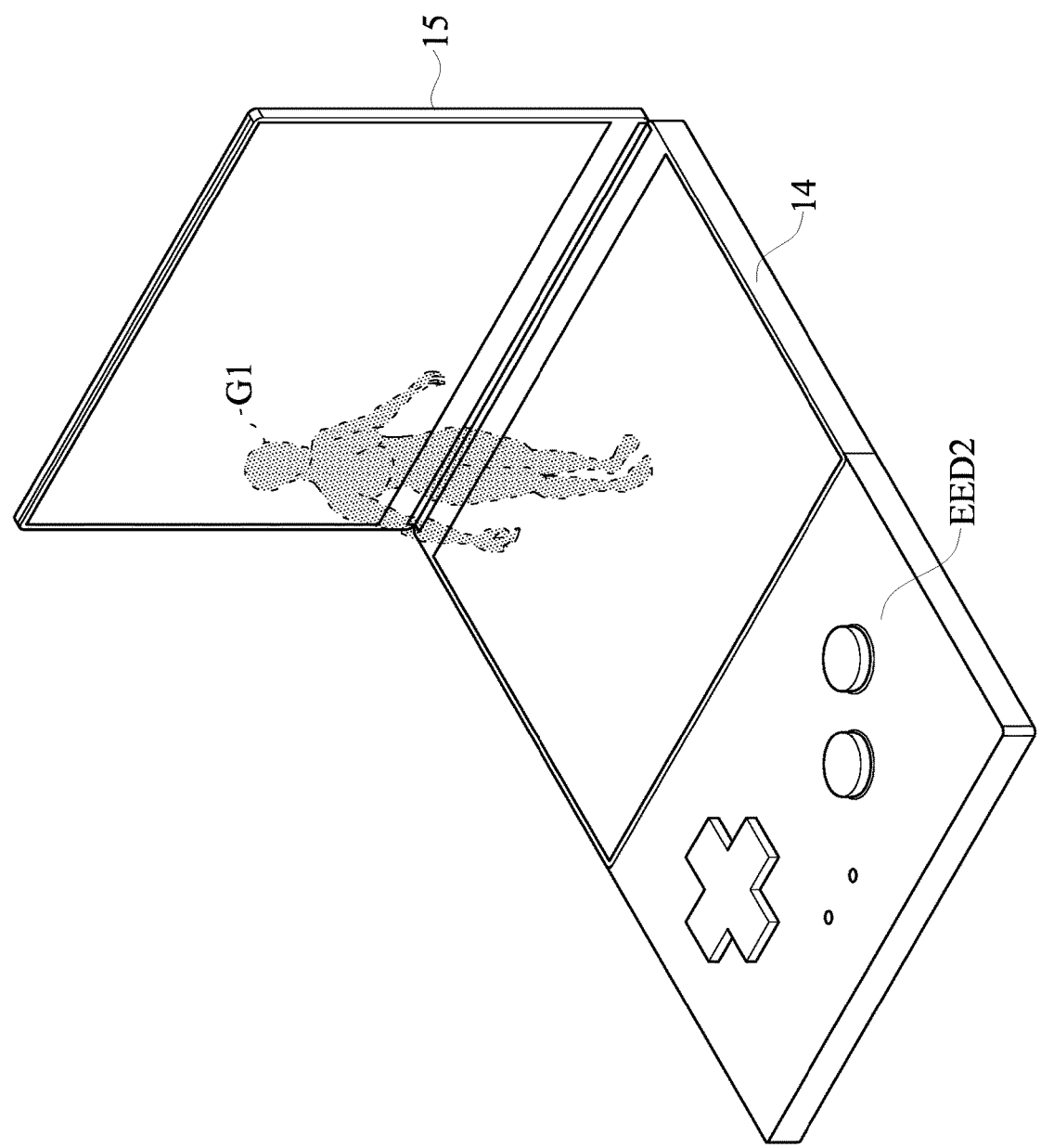
FIG. 10 is another schematic view of the first floating image display device and the second floating image display device of the floating three-dimensional image display system being connected to the second expansion gamepad according to one embodiment of the present disclosure.

Reference is made to FIG. 7 to FIG. 10, in which FIG. 7 is a schematic view of the first floating image display device of the floating three-dimensional image display system according to the embodiment of the present disclosure connecting to a first expansion gamepad, FIG. 8 is a schematic view of the first floating image display device and the second floating image display device of the floating three-dimensional image display system according to the embodiment of the present disclosure connecting to the first expansion gamepad, FIG. 9 is another schematic view of the first floating image display device of the floating three-dimensional image display system according to the embodiment of the present disclosure connecting to a second expansion gamepad, and FIG. 10 is another schematic view of the first floating image display device and the second floating image display device of the floating three-dimensional image display system according to the embodiment of the present disclosure connecting to the second expansion gamepad.

In FIG. 7 and FIG. 9, the first floating image display device 14 cooperates with electronic components such as the controller 11, and are disposed in the casing at the same time. In addition, two sides of the first floating image display device 14 each include an expansion connection module (not shown in figures) for connecting a first expansion gamepad EED1 or a second expansion gamepad EED2. The user can control the integrated floating image information GIN displayed in the space above the first floating image display device 14 by the first expansion gamepad EED1 and the second expansion gamepad EED2. At this time, the first floating image display device 14 and the controller 11 of the floating three-dimensional image display system 1 can receive various image information or control information from the electronic device ED that is disposed at another location. In another embodiment, the first expansion gamepad EED1 and the first floating image display device 14 can be designed as a single unit. The second expansion gamepad EED2 and the first floating image display device 14 can also be designed as a single unit. In the present embodiment, the expansion connection module is a fixed connection component, but the present disclosure is not limited thereto.

In addition, the first floating image display device 14 and the controller 11 of the floating three-dimensional image display system 1 can also receive the image information provided by the server for display.

In FIG. 8 and FIG. 10, the first floating image display device 14 and the second floating image display device 15 cooperate with electronic components such as the controller 11, and are disposed in the casing at the same time. As shown in FIG. 8 and FIG. 10, the second floating image display device 15 is disposed on one side of the first floating image display device 14, and the second floating image display device 15 and the first floating image display device 14 can be folded together.

Figure 11:
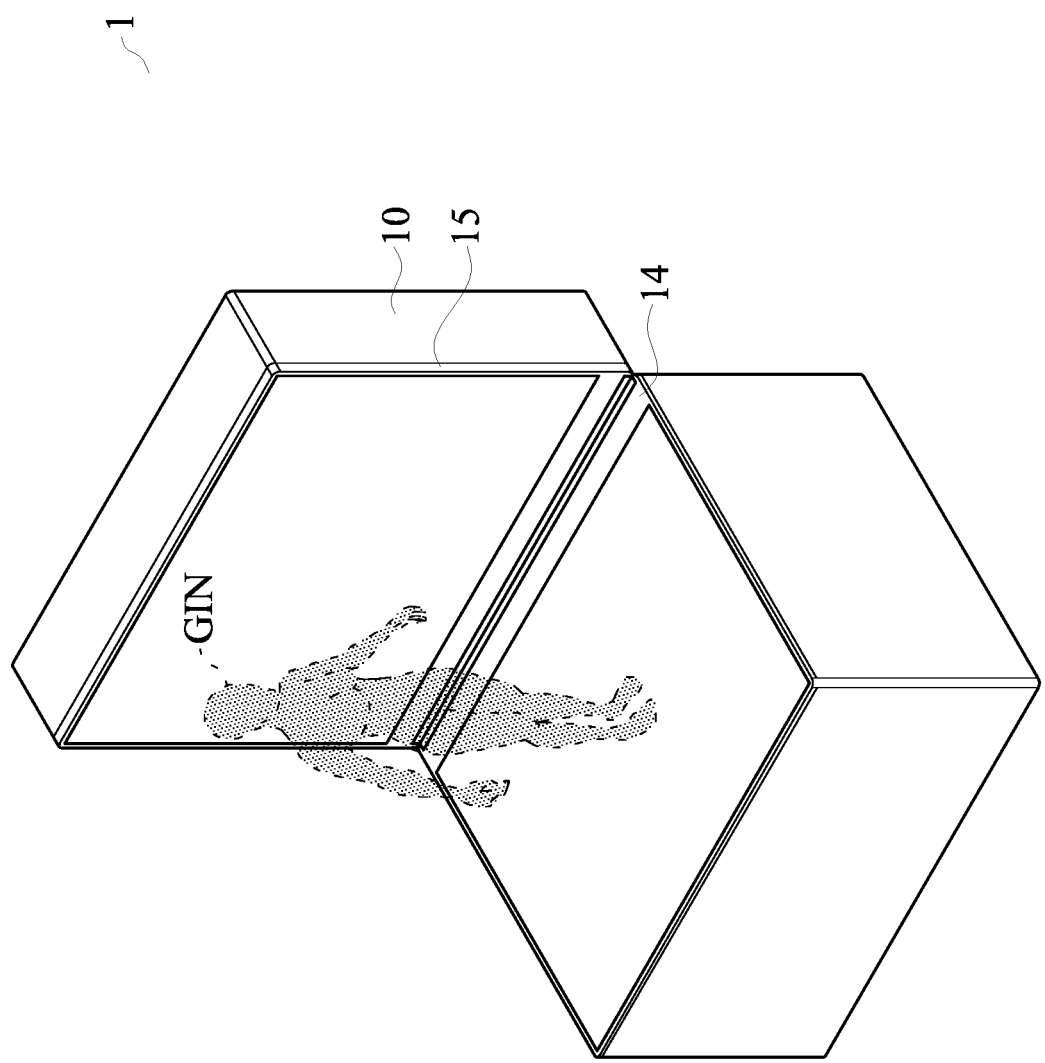
FIG. 11 is a schematic view of the floating three-dimensional image display system being disposed in a casing according to one embodiment of the present disclosure.

Reference is made to FIG. 11, in which FIG. 11 is a schematic view of the floating three-dimensional image display system disposed in a casing according to the embodiment of the present disclosure.

Various electronic components of the floating three-dimensional image display system 1 are disposed in a casing 10, which is openable and can be designed according to user requirements.

Figure 12:
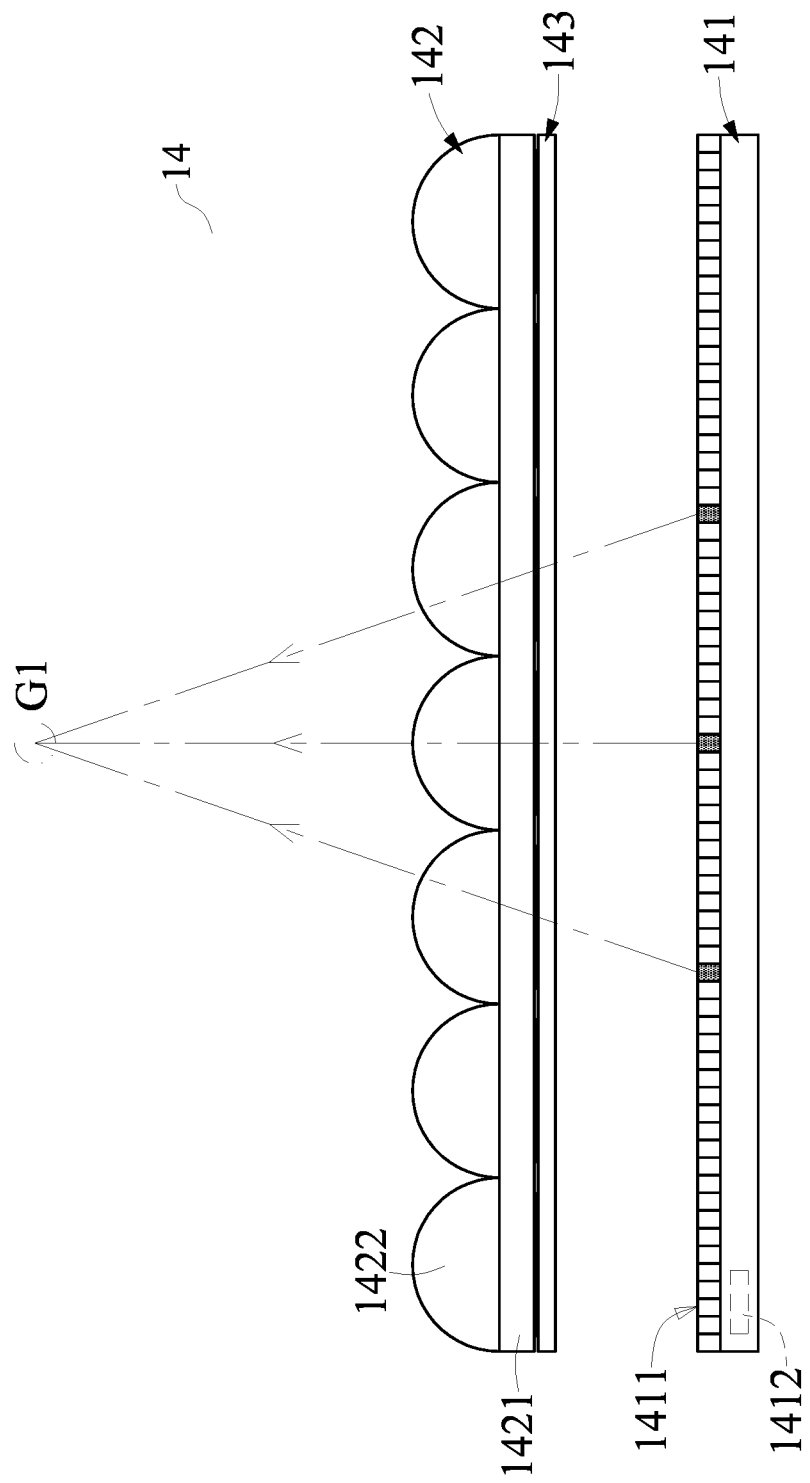
FIG. 12 is a schematic structural view of the first floating image display device.
Figure 13:
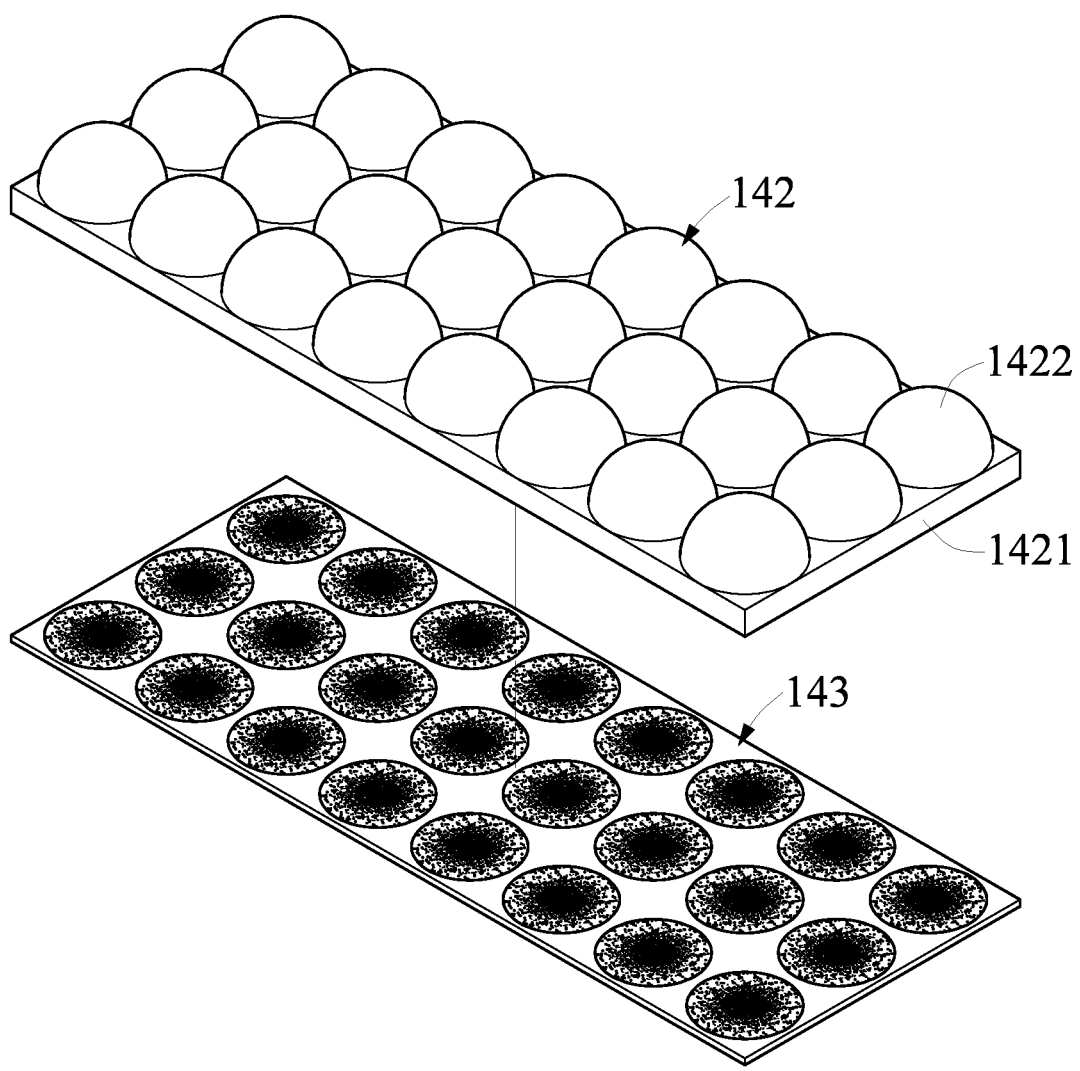
FIG. 13 is a schematic exploded view of the first floating image display device according to the present disclosure.
Figure 14:
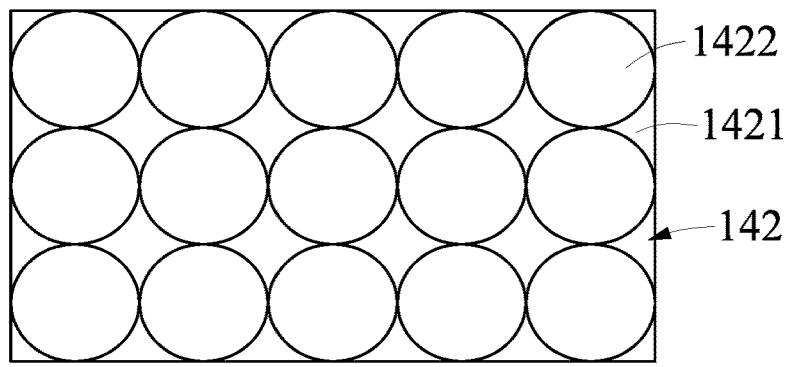
FIG. 14 is a schematic view of lens arrays of the first floating image display device being relatively arranged according to the present disclosure.
Figure 15:
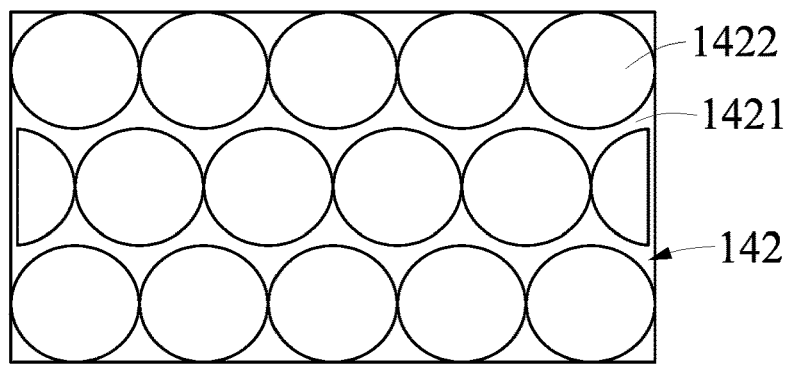
FIG. 15 is a schematic view of the lens arrays of the first floating image display device being arranged in a staggered manner according to the present disclosure.
Figure 16:
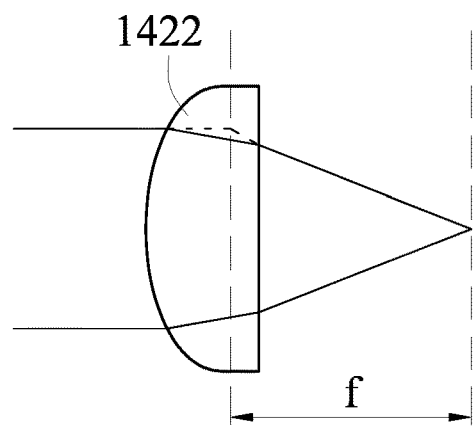
FIG. 16 is a schematic view showing focusing of a single lens of the first floating image display device according to the present disclosure.

Reference is made to FIG. 12 to FIG. 16, in which FIG. 12 is a schematic structural view of the first floating image display device, FIG. 13 is a schematic exploded view of the first floating image display device of the present disclosure, FIG. 14 is a schematic view of lens arrays of the first floating image display device of the present disclosure that are relatively arranged, FIG. 15 is a schematic view of lens arrays of the first floating image display device of the present disclosure that are staggeringly arranged, and FIG. 16 is a schematic view of focusing through a single lens of the first floating image display device of the present disclosure.

The structure and the function of the second floating image display device 15 are similar to those of the first floating image display device 14. Accordingly, only the first floating image display device 14 is described as an example below, and details of the structure and the function of the second floating image display device 15 are not reiterated herein.

The first floating image display device 14 includes a first display module 141, a lens array layer 142 and a microstructure layer 143. Through changing the image displayed, a stereoscopic image seen by a viewer can be changed according to a location of the viewer, so that the viewer can view the stereoscopic image at another location.

In addition, the microstructure layer 143 is a dynamic optical component layer. That is, the microstructure layer 143 has a microstructure function mode and a non-microstructure function mode. The microstructure layer 143 can be adjusted to the microstructure function mode or the non-microstructure function mode according to a control signal. When the microstructure layer 143 is switched to the microstructure function mode, it can be used to adjust an angle and a direction of light. When the microstructure layer 143 is switched to the non-microstructure function mode, the first floating image display device 14 is used for displaying the two-dimensional image information, instead of displaying the three-dimensional image information floating in the space on the one side of the first floating image display device 14. However, in the present embodiment, the first floating image display device 14 can simultaneously display the two-dimensional image information and the floating image information.

The microstructure layer 143 is a liquid crystal lens array layer, which includes a plurality of microstructure liquid crystal lenses. The lens array layer 142 is also a liquid crystal lens array layer, which includes a plurality of optically adjusted liquid crystal lens. That is, the first floating image display device 14 is a display device including at least two liquid crystal lens array layers. In another embodiment, the first floating image display device 14 can include more liquid crystal lens array layers for light adjustment. Further, in another embodiment, the first floating image display device 14 can have different quantities of the first floating image display device 14 provided in different areas for light adjustment. In addition, the lens array layer 142 includes a first structure lens array layer (not shown in figures) and a second structure lens array layer (not shown in figures). The first structure lens array layer (not shown in figures) has a lens structure that can be used for modulating a light field, while the second structure lens array layer (not shown in figures) does not have a lens structure.

The first display module 141 can be a common flat-panel display. The first display module 141 has a display surface 1411 that can be used to display the image. The lens array layer 142 is disposed in proximity to the display surface 1411 of the first display module 141. That is, the lens array layer 142 can be disposed above the first display module 141. The lens array layer 142 can be in contact with or spaced apart from the display surface 1411 of the first display module 141. An intermediate layer can also be provided between the display surface 1411 of the first display module 141 and the lens array layer 142.

The first display module 141 can be arranged at a lowermost layer, which is responsible for displaying a flat image that has not yet undergone light reproduction. Such a flat image can be redistributed and recombined through the lens array of the lens array layer 142, so as to be displayed as the three-dimensional image that is reorganized. The first display module 141 only needs to display a target image, so that the first display module 141 can be in any hardware configuration, such as that of a mobile phone, a tablet computer or a flat-panel display. A type and a configuration of the first display module 141 are not limited herein. The first display module 141 can also be a self-luminous display.

The lens array layer 142 can be arranged at an uppermost layer, and the lens array layer 142 has an effect of modulating the light field. The lens array layer 142 can adjust a light angle of a three-dimensional article, so that the original flat image that has yet to be reorganized can be redistributed and recombined, thereby allowing the viewer to view the three-dimensional image.

The lens array layer 142 is made of a material having a good optical property, and the material of the lens array layer 142 is not limited herein. The lens array layer 142 can include a substrate 1421 and a plurality of lenses 1422. The plurality of lenses 1422 are disposed on a side of the substrate 1421. That is, the plurality of lenses 1422 are disposed on the side of the substrate 1421 that is away from the display module 141. An arrangement and a configuration of the lens array layer 142 are not limited. The plurality of lenses 1422 have a focusing function. The image that has yet to be reorganized (which is displayed on the display surface 1411) can be reorganized and recombined into an integrated image through the lens array layer 142, so that the three-dimensional image is formed.

The first display module 141 can be any specification, as long as the algorithm can be applied thereto. That is, the first display module 141 includes an image calculation unit 1412, and the image used in the first display module 141 needs to be calculated through an image algorithm. By cooperation with the configuration of the lens array, such a calculation predicts various traveling paths of light and calculates a relative position of the image.

The lens array layer 142 of the present disclosure is highly related to a display effect. As shown in FIG. 14 the lens array can be arranged in a rectangular pattern, so that every two adjacent rows of the lens 1422 can be arranged in opposition to each other. As shown in FIG. 15, the lens array can also be arranged in a hexagonal pattern, so that every two adjacent rows of the lens 1422 can be arranged in a staggered manner. In addition, the plurality of lenses 1422 can also be arranged in other ways to display the three-dimensional image information.

The microstructure on the lens array layer 142 is a lens having the focusing function, and a focusing ability of the lens is determined according to a refractive index n value. Available light wavelengths of the lens range from 300 nm to 1100 nm. Focusing through the single lens is as shown in FIG. 16, which conforms to the lensmaker's equation of: $1/f=(n-1)(1/R1-1/R2)$. Here, R1 and R2 are correspondingly the radii of curvature on two side of the lens, f is the focal length of the lens and n is the refractive index of the lens. In addition, the lens having diameters ranging from 100 μm to 5 mm can be applicable to various display devices having various pixel sizes. In another embodiment, the microstructure of the lens array layer 142 can be an aspheric or thick lens whose optical properties are different from those described in the lensmaker's equation above, but the present disclosure is not limited thereto. In another embodiment, the lens array layer 142 can also exclude any microstructure.

Figure 17:
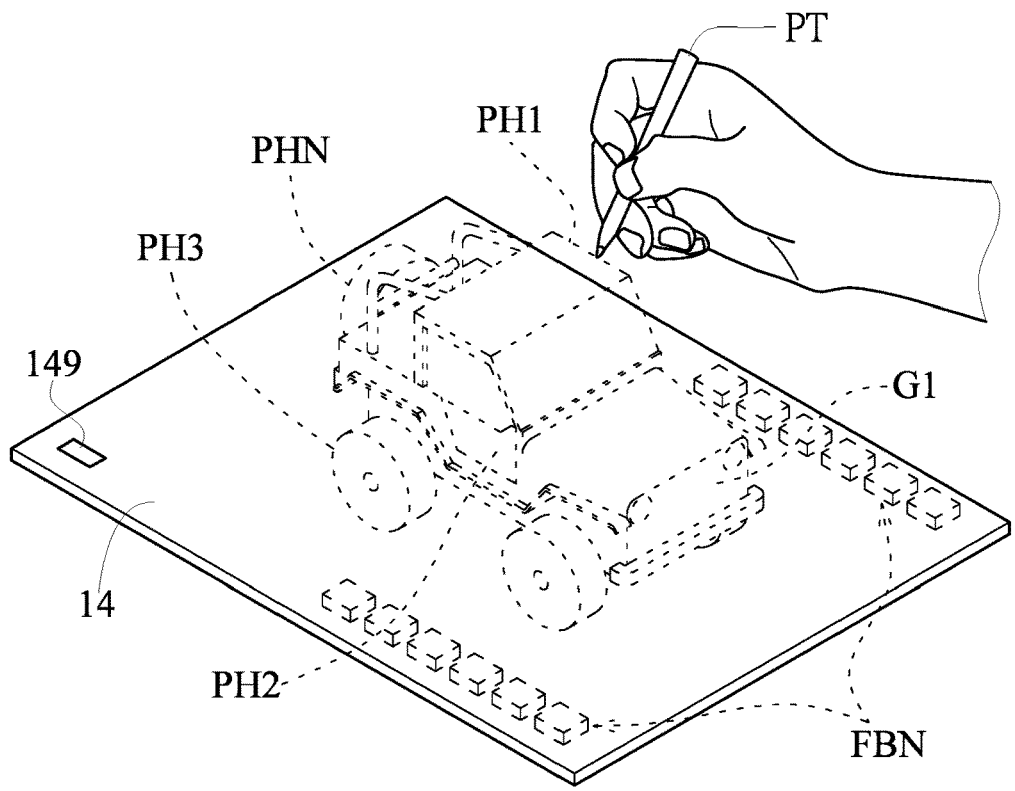
FIG. 17 is a schematic view of the floating image information of the first floating image display device or the second floating image display device interacting with an object.
Figure 18:
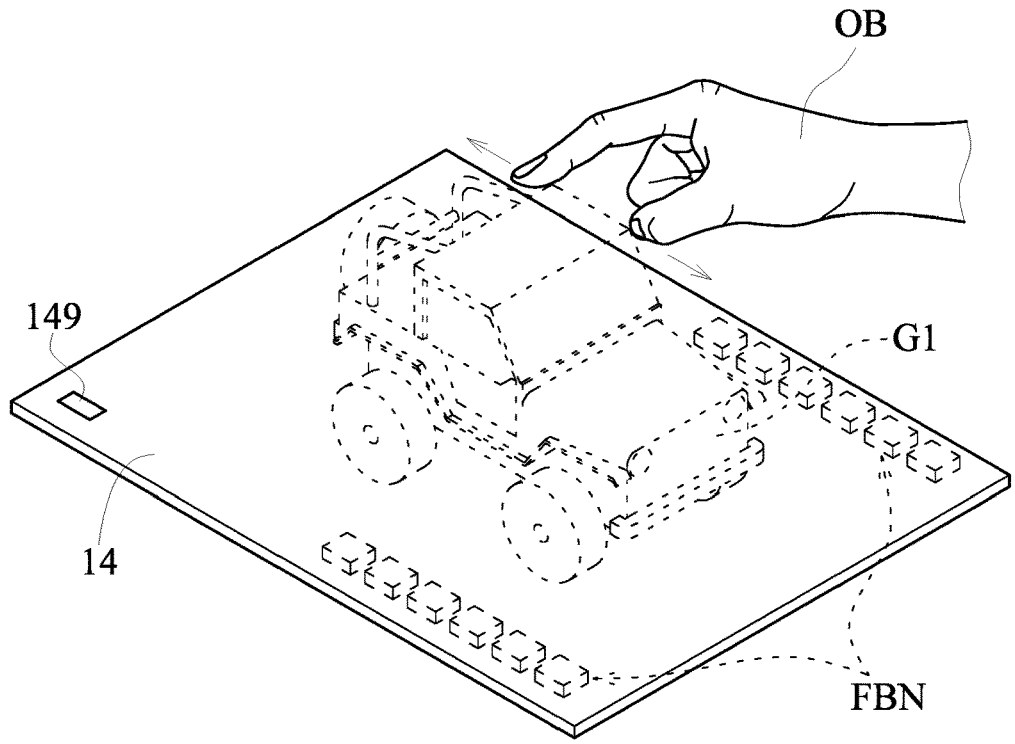
FIG. 18 is another schematic view of the floating image information of the first floating image display device or the second floating image display device interacting with an object.
Figure 19:
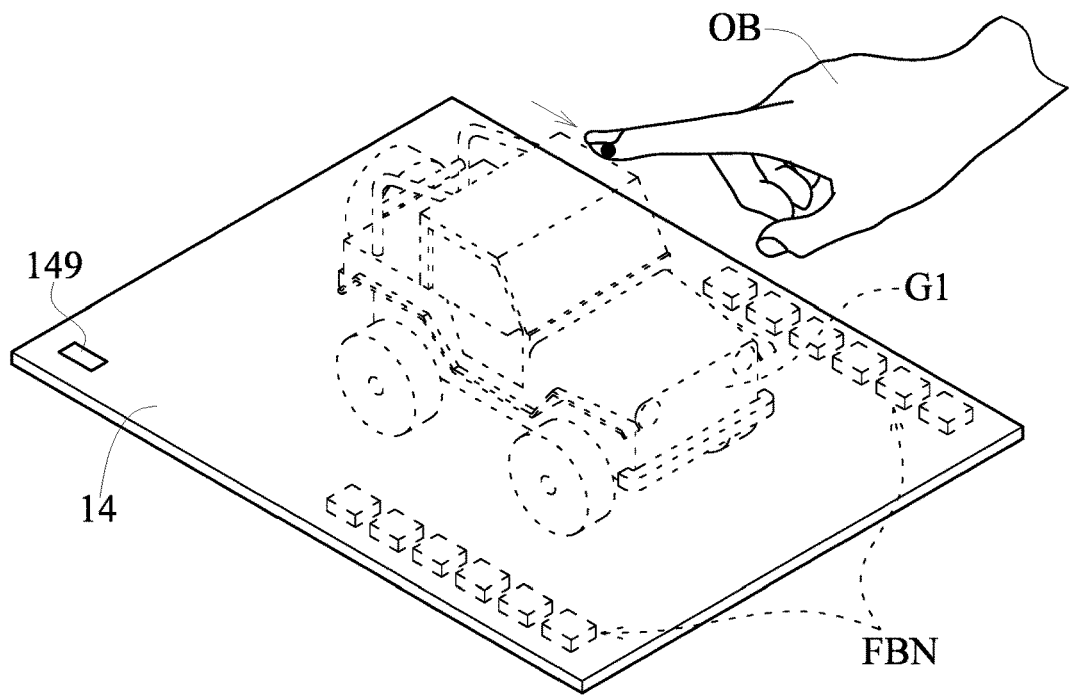
FIG. 19 is still another schematic view of the floating image information of the first floating image display device or the second floating image display device interacting with an object.
Figure 20:
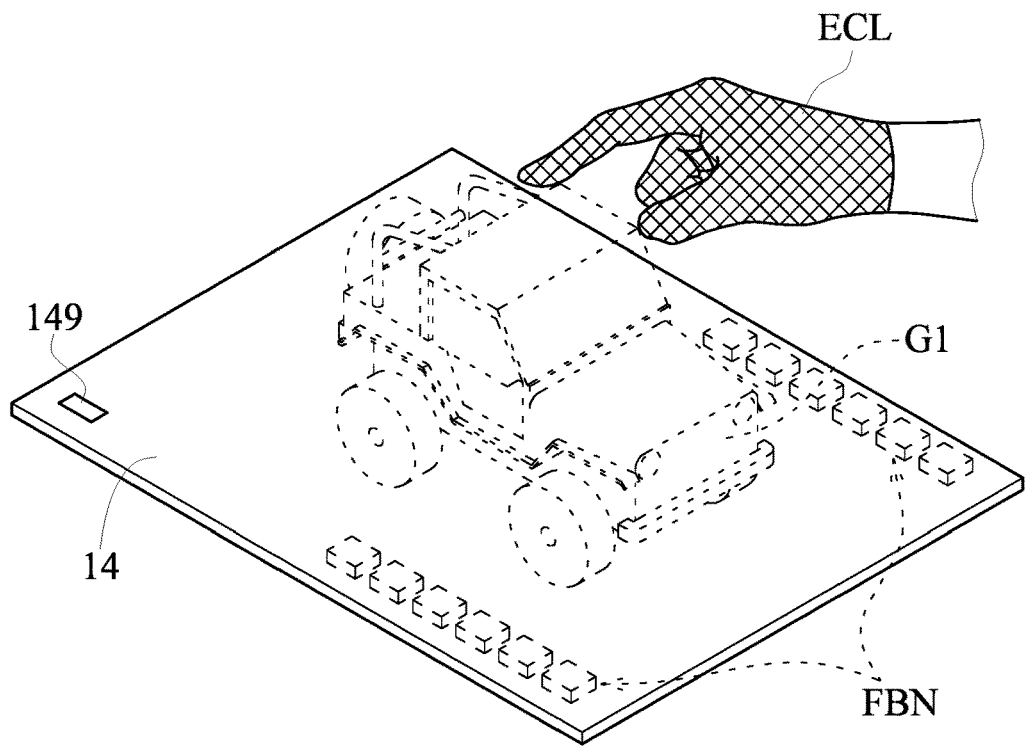
FIG. 20 is yet another schematic view of the floating image information of the first floating image display device or the second floating image display device interacting with an object.

Reference is made to FIG. 17 to FIG. 20, in which FIG. 17 is a schematic view of the floating image information of the first floating image display device or the second floating image display device when interacting with an object, FIG. 18 is another schematic view of the floating image information of the first floating image display device or the second floating image display device when interacting with an object, FIG. 19 is still another schematic view of the floating image information of the first floating image display device or the second floating image display device when interacting with an object, and FIG. 20 is yet another schematic view of the floating image information of the first floating image display device or the second floating image display device when interacting with an object.

The user can interact with the first floating image information G1, the second floating image information G2 or the integrated floating image information GIN by using a finger, an electronic interactive glove ECL or a pen-type interactive component PT.

That is, a sensor 149 of the first floating image display device 14 can be used to detect a coordinate value of a predetermined detection point of an object OB (i.e., a hand of the user), such as an index finger of the user, at least one predetermined coordinate value of the electronic interactive glove ECL, or a predetermined coordinate value of a pen tip of the pen-type interactive component PT. The sensor 149 continuously records a movement track of the predetermined detection point of the object OB within a predetermined time. The sensor 149 transmits a plurality of coordinate values of the movement track of the predetermined detection point of the object OB within the predetermined time to the controller 11. The controller 11 determines an interaction status of the first floating image information G1 according to the index finger of the user, the at least one predetermined coordinate value of the electronic interactive glove ECL, or the predetermined coordinate value of the pen tip of the pen-type interactive component PT. The sensor 149 is an image capturing unit.

Similarly, the second floating image information G2 displayed through the second floating image display device 15, and the integrated floating image information GIN cooperatively displayed through the first floating image display device 14 and the second floating image display device 15 can also be interacted with using the finger, the electronic interactive glove ECL or the pen-type interactive component PT, so that a subsequent display content of the image can be determined.

Furthermore, the user can also use the first floating image display device 14, the second floating image display device 15, and the first floating image display device 14 as well as the second floating image display device 15 to directly draw lines, planar compositions or three-dimensional compositions arranged in a space.

As shown in FIG. 17 to FIG. 20, the user can draw a plurality of tracks PH1 to PHN in a space on one side of the first floating image display device 14 by using the hand, the pen-type interactive component PT or the electronic interactive glove ECL. These tracks are then moved, adjusted or connected to generate the first floating image information G1.

In addition, the first floating image display device 14 can also include a program, which includes a plurality of function processing processes that correspond to a plurality of three-dimensional function buttons FBN. The plurality of three-dimensional function buttons FBN are displayed in the same space on the one side of the first floating image display device 14 as the first floating image information G1 through the first display module 141.

The user can select one of the plurality of three-dimensional function buttons FBN, such as coloring, enlarging, adjusting the material, etc., to process partial or all areas of the first floating image information G1.

That is, the user can selectively process flat areas, three-dimensional areas or all areas formed by the plurality of tracks. Similar to the previous embodiments, the first floating image information G1 can be displayed in the space on the one side of the first floating image display device 14 in a form of an exploded view.

In addition, the first floating image display device 14 can communicate with the server through the controller 11 and the communication module 13. The server can perform a calculation of a plurality of tracks of a large amount of first floating image information G1. In the present embodiment, the calculation of the two-dimensional image information and the three-dimensional image information can be performed by the first floating image display device 14 and the controller 11, or can be carried out through cloud computing on the remote server. Then, the calculated two-dimensional image information or the calculated three-dimensional image information is transmitted to the controller 11.

Beneficial Effects of the Embodiments

In conclusion, one of the beneficial effects of the present disclosure is that the floating three-dimensional image display system is capable of receiving the image information provided by the electronic device and converting the same to display the three-dimensional floating image information, so that a user experience can be expanded and the user can interact with the three-dimensional floating image information in real time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A floating three-dimensional image display system receiving a plurality of image information or a plurality of control signals of an electronic device, comprising:
   a controller;
   a first floating image display device electrically connected to the controller; and
   a second floating image display device electrically connected to the controller, the second floating image display device being detachably connected to the first floating image display device, and the first floating image display device and the second floating image display device having an included angle therebetween;
   wherein the first floating image display device includes a first side and a second side, the first side and the second side of the first floating image display device are opposite disposed, the first side of the first floating image display device is facing up, and the second side of the first floating image display device is configured to be disposed on a surface of a supporting device, the second image display device includes a first side and a second side, the first side and the second side of the second floating image display device are opposite disposed, the first side of the second floating image display device is facing up, and the second side of the second floating image display device is configured to be disposed on the surface of the supporting device;
   wherein the controller generates a plurality of first floating image information according to the plurality of image information and a plurality of depth information, and displays the plurality of first floating image information in a space between the first side of the first floating image display device and the first side of the second image display device through the first floating image display device when the second floating image display device is detachably connected to the first floating image display device;
   wherein a plurality of second floating image information are displayed in the space between the first floating image display device and the the second floating image display device according to the plurality of image information of the electronic device;
   wherein the controller converts the plurality of image information of the electronic device into the plurality of first floating image information and the plurality of second floating image information, and the plurality of first floating image information and the plurality of second floating image information are collectively displayed as a plurality of integrated floating image information;
   wherein a plurality of light of the plurality of integrated floating image information are directly touched by and interacts with an object.

2. The floating three-dimensional image display system according to claim 1, the first floating image display device further including: a sensor, the sensor of the first floating image display device is configured to detect a coordinate value of a predetermined detection point of the object, the sensor continuously records a movement track of the predetermined detection point of the object within a predetermined time, the sensor transmits a plurality of coordinate values of the movement track of the predetermined detection point of the object within the predetermined time to the controller, the controller determines an interaction status of the first floating image information according to the at least one predetermined coordinate value of the object;

wherein the object is a hand of a user, an interactive glove or a pen-type tool.

3. The floating three-dimensional image display system according to claim 1, wherein the electronic device is connected to at least one peripheral device, the at least one peripheral device transmits a plurality of control signals to control the plurality of integrated floating image information, and the at least one peripheral device is a smart phone, a tablet computer, a smart watch, a joystick, a gamepad, a remote controller, a mouse device or a motion controller.

4. The floating three-dimensional image display system according to claim 3, wherein the first floating image display device further includes an expansion connection module connected to the at least one peripheral device to receive the plurality of control signals of the at least one peripheral device, so as to control the first floating image information displayed by the first floating image display device or the integrated floating image information cooperatively displayed by the first floating image display device and the second floating display device.

5. The floating three-dimensional image display system according to claim 4, wherein the expansion connection module is a connection fixing component.

6. The floating three-dimensional image display system according to claim 5, further including a casing, the first floating image display device and the second floating image display device being disposed in the casing.

7. The floating three-dimensional image display system according to claim 6, wherein the floating three-dimensional display system is connected to the electronic device or a server, and the plurality of image information and the plurality of control signals are calculated and provided by the electronic device or the server.

8. The floating three-dimensional image display system according to claim 1, wherein the first floating image display device includes:
 a flat-panel display module for displaying two-dimensional image information; and
 a lens array layer disposed on the flat-panel display module;
 wherein the two-dimensional image information is displayed as floating three-dimensional image information in the space above the first side of the first floating image display device through the lens array layer.

9. The floating three-dimensional image display system according to claim 8, wherein the first floating image display device further includes a microstructure layer disposed on the lens array layer.

* * * * *